US007583060B2

(12) United States Patent
Kim

(10) Patent No.: US 7,583,060 B2
(45) Date of Patent: Sep. 1, 2009

(54) PROTECTIVE CIRCUIT FOR A SECONDARY BATTERY PACK AND METHOD OF OPERATING THE SAME

(75) Inventor: Jong Sam Kim, Youngin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 474 days.

(21) Appl. No.: 11/219,520

(22) Filed: Sep. 2, 2005

(65) Prior Publication Data

US 2006/0077603 A1   Apr. 13, 2006

(30) Foreign Application Priority Data

Sep. 7, 2004   (KR) .................. 10-2004-0071414

(51) Int. Cl.
*H02J 7/00* (2006.01)
*H02H 3/00* (2006.01)

(52) U.S. Cl. .................. 320/134; 361/94

(58) Field of Classification Search .......... 320/110, 320/112, 114, 116, 117, 118, 119, 122, DIG. 21, 320/134, 135, 136, 121; 429/61, 62, 90, 429/92, 122, 149, 160; 361/90, 94
See application file for complete search history.

(56) References Cited

U.S. PATENT DOCUMENTS

| | | | |
|---|---|---|---|
| 5,206,578 A * | 4/1993 | Nor .................. 320/118 |
| 5,422,558 A * | 6/1995 | Stewart ............ 320/120 |
| 5,424,936 A * | 6/1995 | Reddy .............. 363/97 |
| 5,530,336 A * | 6/1996 | Eguchi et al. ...... 320/118 |
| 5,547,775 A * | 8/1996 | Eguchi et al. ...... 320/118 |
| 5,548,196 A * | 8/1996 | Lim .................. 318/701 |
| 5,578,914 A | 11/1996 | Morita |
| 5,581,170 A * | 12/1996 | Mammano et al. .. 320/116 |
| 5,781,390 A * | 7/1998 | Notaro et al. ...... 361/84 |
| 5,789,900 A * | 8/1998 | Hasegawa et al. .. 320/132 |
| 5,898,293 A * | 4/1999 | Tamai et al. ....... 320/136 |
| 5,965,996 A * | 10/1999 | Arledge et al. ..... 320/116 |
| 6,150,795 A * | 11/2000 | Kutkut et al. ...... 320/118 |

(Continued)

FOREIGN PATENT DOCUMENTS

JP   10-136581   5/1998

(Continued)

OTHER PUBLICATIONS

Patent Abstracts of Japan, Publication No. 10-136581; Publication Date: May 22, 1998; in the name of Okuto.

*Primary Examiner*—Akm E Ullah
*Assistant Examiner*—M'Baye Diao
(74) *Attorney, Agent, or Firm*—Christie Parker & Hale LLP

(57) ABSTRACT

A protective circuit for a secondary battery pack advantageously having a simple circuit configuration while maintaining the safety of banks in the circuit. Each protective circuit has banks adapted to be charged or to discharge voltage, each bank being coupled to a controller that senses the charging or discharging voltage of the bank and outputs a predetermined value if overcharging or over-discharging is sensed. A level shifter is adapted to shift the voltage output from the controller to an adjusted voltage approximately equal to the voltage output from one of the other controllers. A switching means controls the stopping of charging or discharging of the banks.

17 Claims, 5 Drawing Sheets

U.S. PATENT DOCUMENTS

| | | | |
|---|---|---|---|
| 6,192,125 B1 * | 2/2001 | Norsworthy et al. | 379/399.01 |
| 6,373,225 B1 * | 4/2002 | Haraguchi et al. | 320/122 |
| 6,771,045 B1 * | 8/2004 | Keller | 320/118 |
| 6,889,038 B2 * | 5/2005 | Khosrowbeygi | 455/333 |
| 2003/0062874 A1 * | 4/2003 | Furukawa | 320/121 |
| 2003/0152830 A1 * | 8/2003 | Eaves | 429/156 |
| 2004/0232889 A1 * | 11/2004 | Sudo et al. | 320/149 |
| 2006/0076923 A1 * | 4/2006 | Eaves | 320/112 |

FOREIGN PATENT DOCUMENTS

| | | |
|---|---|---|
| JP | 2003282153 A * | 10/2003 |

* cited by examiner

# PROTECTIVE CIRCUIT FOR A SECONDARY BATTERY PACK AND METHOD OF OPERATING THE SAME

CROSS REFERENCE TO RELATED APPLICATION

This application claims priority to and the benefit of Korean Patent Application No. 2004-0071414 filed on Sep. 7, 2004 in the Korean Intellectual Property Office, the entire content of which is incorporated herein by reference.

BACKGROUND OF THE INVENTION

1. Field of the Invention

The present invention relates to a protective circuit for a secondary battery pack and a method of operating the protective circuit. More particularly, the present invention relates to a protective circuit and method that shifts the output voltages of one or more controllers such that each of the controllers in the circuit has approximately the same voltage output thus providing a simple protective circuit configuration while maintaining the safety of the banks in the circuit.

2. Description of the Related Art

In a conventional secondary battery, for example, in a lithium ion battery or a lithium polymer battery, each cell has a positive electrode plate, a negative electrode plate and a separator wound into a jelly roll. Each cell may output a voltage of about 4 volts (V). In the case of laptop computers or other electronic appliances that consume a large amount of electric power, a number of cells are coupled in series or in parallel to obtain an output voltage of about 16V to about 32V. When coupled in parallel, the cells may have a capacity of thousands of milliamp hours (mAh). A number of laptop computers contain secondary batteries configured with a group of four cells coupled in series, wherein each of the cells is coupled in parallel to another cell that is not one of the four cells in series, i.e., 4S1P mode. Each configuration of cells is a bank. A number of banks each having 4S1P mode may be coupled in series or in parallel. As is well known in the art, if a bank has an output voltage of about 16V, two banks coupled in series will have a total output voltage of about 32V.

Each bank has a protective circuit that has a controller coupled with the bank to protect the bank from overcharging or from over-discharging voltage. For example, conventional field effect transistors and/or fuses are installed on a large-current line and are cut off, thereby reducing the current flow to and from the bank, when the bank is overcharging or over-discharging, respectively.

When a number of banks are coupled in series, each bank outputs a different voltage. Since a controller senses the amount of charging or discharging voltage of a bank, and outputs a corresponding voltage, each controller disadvantageously outputs a different voltage. Accordingly, the number of field effect transistors or fuses must disadvantageously correspond to that of the controllers which control them. Further, field effect transistors or fuses coupled with controllers may need to be designed with different specifications due to different output voltages from the controllers.

SUMMARY OF THE INVENTION

Exemplary embodiments of the present invention provide a protective circuit for a secondary battery adapted to shift the voltage output from one or more controllers such that the adjusted voltage output is approximately equal to the voltage output of the other controllers. The protective circuit thereby maintains a simple circuit configuration while preventing the secondary battery banks from overcharging or over-discharging.

One exemplary embodiment of the present invention provides a protective circuit for a secondary battery pack. The protective circuit has a number of banks adapted to be charged or to discharge voltage. The protective circuit also has a number of controllers, each one of the controllers being adapted to sense a charging or discharging voltage of one of the banks and output a predetermined voltage if overcharging or over-discharging is sensed. The protective circuit also includes at least one level shifter adapted to shift a voltage output from one of the controllers to create an adjusted voltage output approximately equal to an output voltage from another one of the controllers. The protective circuit also includes a switching means adapted to stop the charging or discharging of the plurality of banks.

An exemplary embodiment of the present invention also provides a protective circuit for a secondary battery pack. The protective circuit has a first bank adapted to be charged or to discharge voltage and having a number of cells coupled in series and in parallel. The protective circuit has a second bank adapted to be charged or discharge voltage and coupled in series to the first bank and having a plurality of cells coupled in series and in parallel. The protective circuit has a first controller adapted to sense the charging or discharging voltage of the first bank and output a voltage output from the first controller if overcharging or over-discharging is sensed. The protective circuit has a second controller adapted to sense the charging or discharging voltage of the second bank and output a voltage output from the second controller if overcharging or over-discharging is sensed. The protective circuit has a level shifter adapted to shift the voltage output of the second controller to approximately the same voltage output of the first controller to create an adjusted voltage output. The protective circuit has a first switch adapted to be toggled on/off in response to the voltage output from the first controller or from the adjusted voltage output from the level shifter. The protective circuit has a second switch coupled with a large-current line for charging or discharging each of the first bank and the second bank, and adapted to be toggled on/off to stop the charging or discharging of the first bank and the second bank in response to whether the first switch is toggled on/off.

An exemplary embodiment of the present invention also provides a method of operating a protective circuit for a secondary battery pack. In response to sensing overcharging or over-discharging from one of a number of banks, a voltage at one of the controllers is output. In response to at least one level shifter receiving a voltage output from one of the controllers, at the at least one level shifter the voltage output from one of the controllers is shifted to create an adjusted voltage output, the adjusted voltage output being approximately equal to the voltage output from another one of controllers. In response to the voltage output from one of the controllers or the adjusted voltage output from the at least one level shifter, a switching means controls stopping the charging or discharging of a plurality of banks.

DETAILED DESCRIPTION

Figure 1:
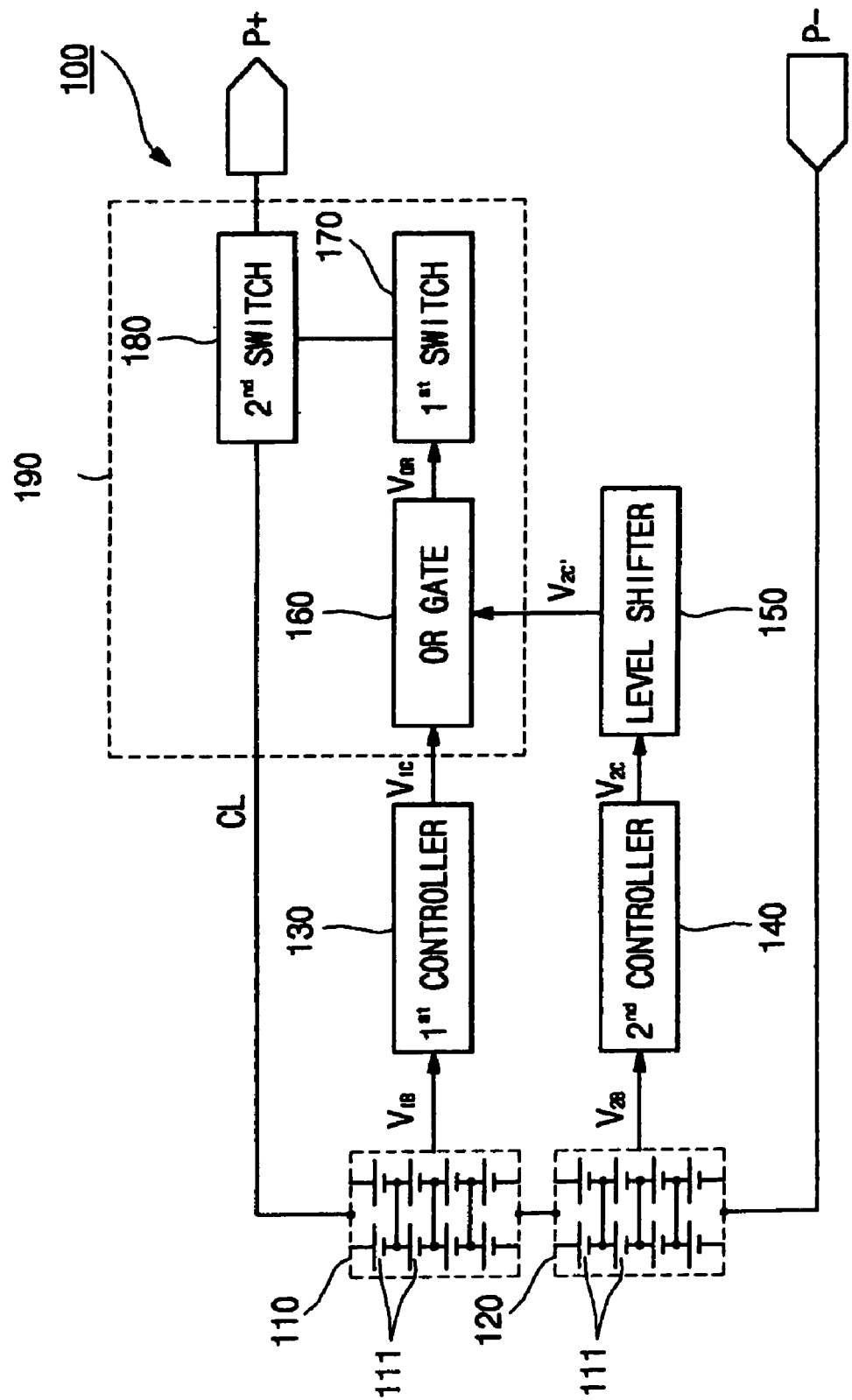
FIG. 1 is a block diagram showing a protective circuit for a secondary battery pack according to an exemplary embodiment of the present invention.

Referring to FIG. 1, an exemplary embodiment of a protective circuit for a secondary battery pack according to the present invention may include a first bank 110; a second bank 120; a first controller 130 for sensing the charging or discharging voltage of the first bank 110 and outputting a corresponding predetermined voltage $V_{1C}$; a second controller 140 for sensing the charging or discharging voltage of the second bank 120 and outputting a corresponding predetermined voltage $V_{2C}$; a level shifter 150 for shifting the output voltage from the second controller 140 and outputting the shifted voltage $V_{2C}$; an OR gate 160 for outputting a predetermined voltage $V_{OR}$ based on the output voltage from the first controller 130 or the level shifter 150; a first switch 170 controlled by the OR gate 160; a second switch 180 controlled by the first switch 170 to toggle the charging or discharging state of the first bank 110 and the second banks 120; a charging terminal P+; and a discharging terminal P−. The protective circuit may alternately include a switching means 190 to control stopping the charging or discharging of the banks. The switching means 190 may include the OR gate 160, the first switch 170 and the second switch 180. Alternately, the switching means 190 may be any other structure (whether implemented in hardware, software, or otherwise) or combination thereof adapted to stop the charging or discharging of the banks.

The first bank 110 may be a secondary battery adapted to be either charged or to discharge voltage or to be capable of both being charged and discharging voltage. The first bank 110 may have any number of cells 111 coupled in any number of configurations. For example, the first bank 110 may have cells arranged in 4S1P mode. In 4S1P mode, a bank has four cells 111 coupled in series, wherein each of the cells 111 is coupled in parallel to another cell 111 that is not one of the four cells 111 in series, as shown inside first bank 110 and second bank 120 of FIG. 1. By way of example but not limitation, each cell 111 may have a charging or discharging voltage of about 4V and the total charging or discharging voltage for a bank in 4S1P mode therefore be about 16V. Other voltage values are envisaged as being output from the first bank 110, second bank 120 as dictated by the design of the respective bank.

The second bank 120 may be a secondary battery adapted to be either charged or to discharge voltage or to be capable of both being charged and discharging voltage. Second bank 120 may be in 4S1P mode as in the case of the first bank 110. As explained above, the total charging or discharging voltage may be about 16V if each cell 111 charging or discharging voltage is about 4V. The second bank 120 may be coupled in series to the first bank 110. Therefore, the total charging or discharging voltage of the first bank 110 and the second bank 120 may be about 32V.

The first controller 130 may be coupled to the first bank 110 and adapted to sense the charging or discharging voltage $V_{1B}$ and current of the first bank 110, and output a predetermined corresponding voltage $V_{1C}$ in response to the first bank 110 overcharging or over-discharging. As is well known to those of ordinary skill in the art, a separate sensor (such as a sensor register) (not shown) may be added to the protective circuit to sense the charging or discharging voltage $V_{1B}$ and current of the first bank 110. Those skilled in the art are familiar with the design and function of such sensors and the design of protective circuits incorporating such sensors. When the first bank 110 is coupled in series to the second bank 120, the first controller 130 senses the total voltage of the first bank 110 and the second bank 120. Therefore, the output voltage $V_{1C}$ from the first controller 130 may be approximately equal to the total voltage of the first bank 110 and the second bank 120. For example, using the voltages in the paragraphs above, the first controller 130 voltage $V_{1C}$ may be about 32V. The first controller 130 may be realized as any number of types of chips including, but not limited to, a microcomputer chip or a logic circuit chip.

The second controller 140 may be coupled to the second bank 120 and adapted to sense the charging or discharging voltage $V_{2B}$ and current of the second bank 120, and output a predetermined corresponding voltage $V_{2C}$ in response to the second bank 120 overcharging or over-discharging. As noted above, a separate sensor (such as a sensor register) (not shown) may be added to the protective circuit to sense the charging or discharging voltage $V_{2B}$ and current of the second bank 120. The second controller 140 may sense the voltage $V_{2B}$ of the second bank 120 only, and the output voltage $V_{2C}$ from the second controller 140 may therefore be approximately equal to the voltage $V_{1B}$ of the second bank 120. The second controller 140 may be realized as any number of types of chips including, but not limited to, a microcomputer chip or a logic circuit chip.

The level shifter 150 may be adapted to shift the output voltage $V_{2C}$ of the controller to which it is coupled. The level shifter 150 may shift the output voltage by raising or lowering the output voltage. The level shifter 150 may be adapted to shift the output voltage $V_{2C}$ from the second controller 140 to approximately equal to output voltage $V_{1C}$ of the first controller 130, and output that shifted voltage $V_{2C}$ to the OR gate 160.

Figure 2:
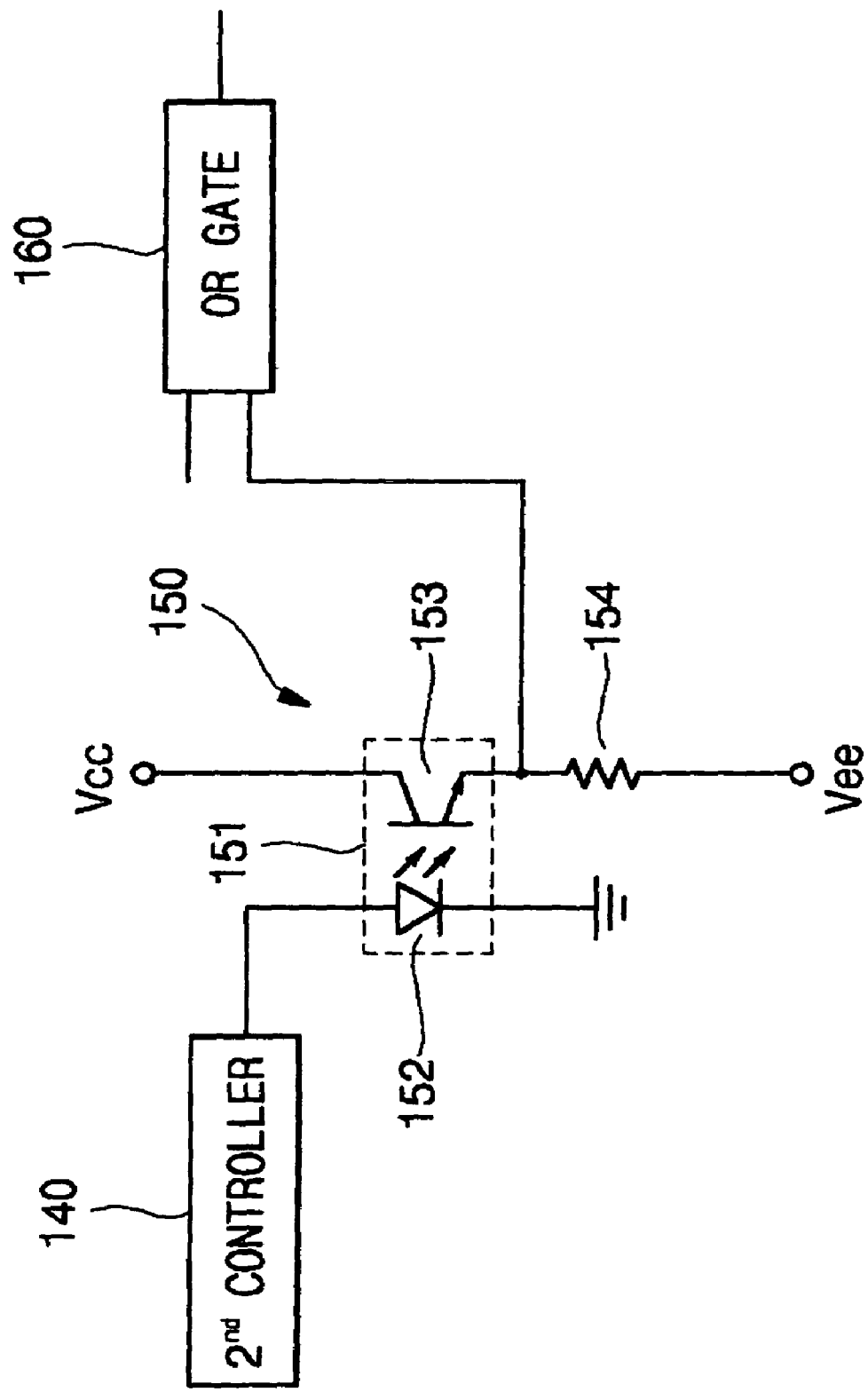
FIG. 2 is a circuit diagram showing circuitry of a level shifter of a protective circuit for a secondary battery pack according to an exemplary embodiment of the present invention.

Any number of devices may be used to implement the level shifter 150. Referring to FIG. 2, by way of example but not limitation, a conventional photo coupler 151 may be used to implement the level shifter 150. Alternately, a group of transistors may be designed to constitute a level shifter 150. The level shifter 150 may have a light-emitting diode (LED) 152, a photo transistor 153, and a load resistor 154. As shown in FIG. 2, the LED 152 may be coupled to the second controller 140 and the photo transistor 153 may be positioned adjacent to the LED 152 so that the photo transistor 153 is capable of being turned on by light emitted from the LED 152. A Vcc voltage may be applied to the collector portion of the photo transistor 153; and a Vee voltage may be applied to the bottom end portion of the load resistor 154. The load resistor 154 may be coupled to the emitter of the photo transistor 153. The top end of the load resistor 154 may be coupled to the emitter portion of the photo transistor 153 at a point at which they are both coupled to the OR gate 160 as shown in FIG. 2. Using the voltage values in the foregoing paragraphs as an example, when a voltage of 16V is output from the second controller 140, the level shifter 150 shifts the voltage to 32V and outputs the shifted voltage $V_{2C}$ to the OR gate 160. Therefore, even when the first controller 130 and the second controller 140 output different levels of voltage from one another (in this case 32V and 16V, respectively), the OR gate 160 can process all of the outputs.

Referring back to FIG. 1, the OR gate 160 may be coupled to the first controller 130 and the level shifter 150. When either the output voltage $V_{1C}$ of the first controller 130 or the output voltage $V_{2C}$ of the level shifter 150 is received at the OR gate 160, the OR gate 160 may output a predetermined voltage corresponding to the input voltage. The OR gate 160 may be designed to recognize the output voltage $V_{1C}$ from the first controller 130 $V_{1C}$ as corresponding to a "high" state. Using the voltage values above for example, a voltage $V_{1C}$ of 32V may be recognized as a "high" state. Accordingly, if the output voltage $V_{2C}$ of the second controller 140 has an output voltage of 16V and if this signal was a direct input to the OR gate 160, $V_{2C}$ may not be recognized as a "high" state. Therefore, this embodiment of the present invention would employ the level shifter 150 to shift the output voltage $V_{2C}$ of the second controller 140 from 16V to 32V and inputs the shifted voltage $V_{2C}$ 32V to the OR gate 160. Accordingly, the OR gate 160 can use the output voltages from the first and second controllers 130 and 140, even when the voltages output from the controllers differ. As is well known to those of ordinary skill in the art, although the OR gate 160 is constructed to recognize the output voltage from the first controller 130 as a "high" state in this embodiment, the opposite construction is also possible. Particularly, the output voltage $V_{2C}$ 16V from the second controller 140 can be recognized as a "high" state and the output voltage $V_{2C}$ 32V from the first controller 130 can be subjected to level shift (voltage drop) so that it is equal to the output voltage $V_{2C}$ 16V from the second controller 140 and used as the input signal for the OR gate 160.

Referring to FIG. 1, the first switch 170 may be coupled to the output end of the OR gate 160 and may be toggled on/off in response to the OR gate 160 output voltage $V_{OR}$. When the OR gate 160 outputs a predetermined voltage $V_{OR}$, the first switch 170 may be toggled on and, when the OR gate 160 does not output a predetermined voltage, the first switch 170 may remain toggled off.

Figure 3:
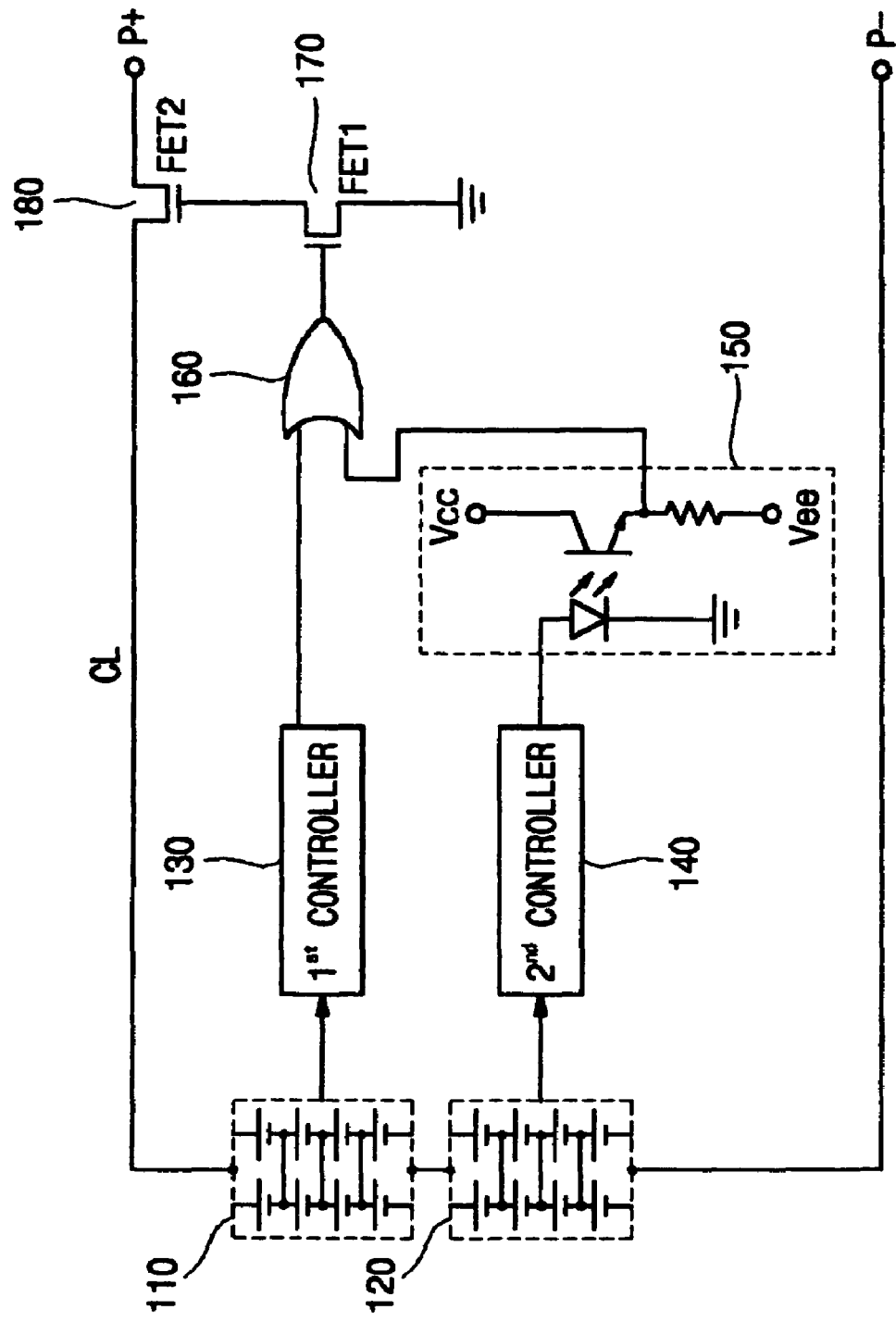
FIG. 3 is a circuit diagram showing a protective circuit for a secondary battery pack according to another exemplary embodiment of the present invention.
Figure 4:
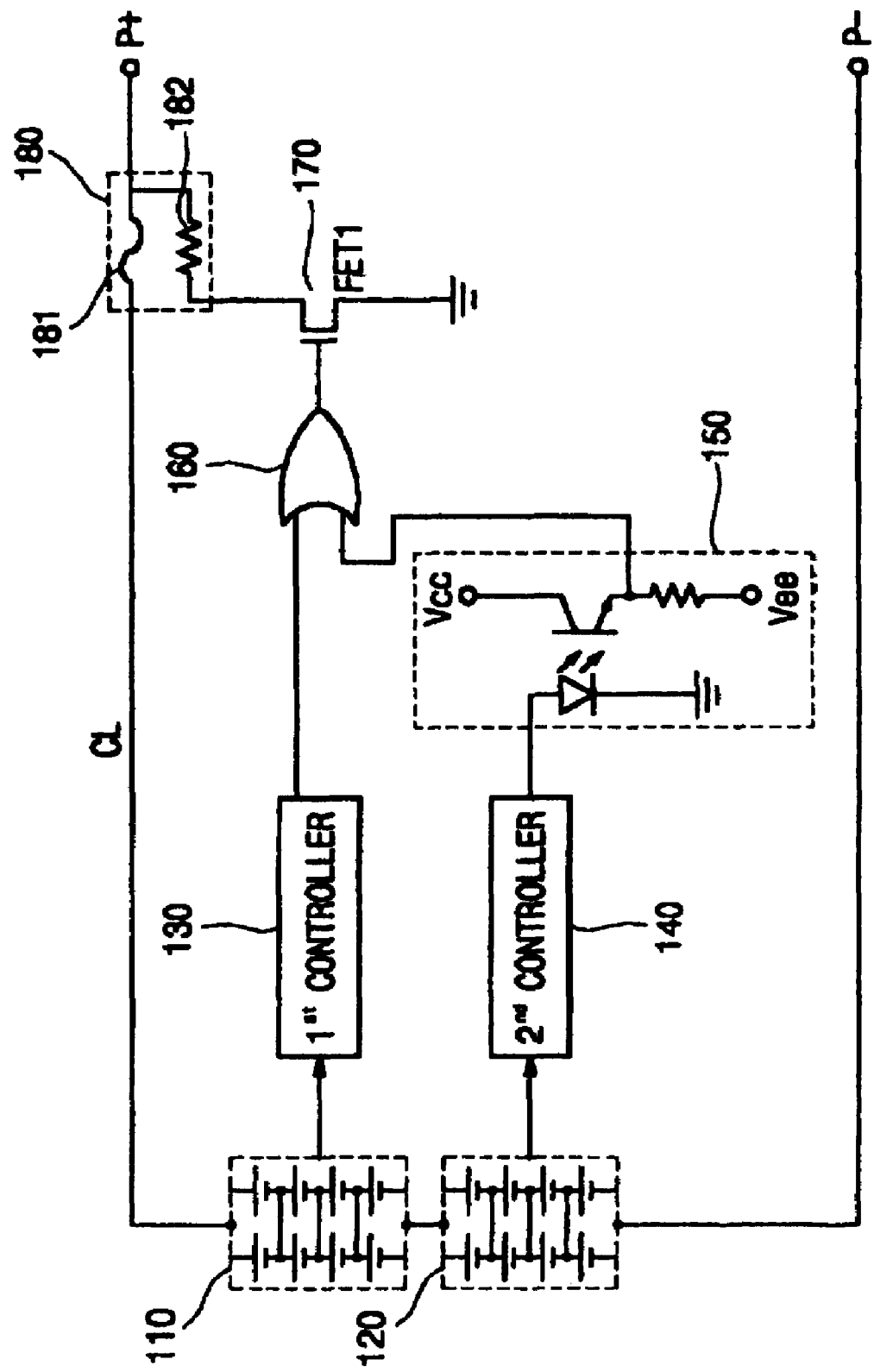
FIG. 4 is a circuit diagram showing a protective circuit for a secondary battery pack according to another exemplary embodiment of the present invention.

Referring to FIGS. 3 and 4, by way of example but not limitation, the first switch 170 may be a field effect transistor FET1. Particularly, the field effect transistor FET1 may have a gate coupled to the output end of the OR gate 160. When the output from the OR gate 160 corresponds to a "high" state, the first switch 170 may be toggled on and, when the output corresponds to a "low" state, the first switch 170 may be toggled off.

The second switch 180 may be installed on a large-current line CL. The large-current line CL may be coupled to a charging terminal P+ and a discharging terminal P− and conduct current for charging or discharging the first bank 110 and second bank 120. The toggle state of the second switch 180 may be the opposite of the toggle state of the first switch 170. For example, the second switch 180 may be toggled off when the first switch 170 is toggled on and may be toggled on when the first switch 170 is toggle off.

Referring to FIG. 3, the second switch 180 may be a field effect transistor FET2. As the second switch 180 is toggled off, the first bank 110 and second bank 120 stop functioning. The FET2 may be adapted to endure a large current.

Referring to FIG. 4, in another exemplary embodiment the second switch 180 may be a fuse 181 coupled to a heating resistor 182. The fuse may be capable of being melted by heat, and the heating resistor 182 may be positioned between the first switch 170 and the large-current line CL together with the fuse 181. When the first switch 170 is toggled on, currents may flow through the heating resistor 182 and the fuse 181 may be cut off due to high temperature caused by the heating resistor 182. As a result, the first bank 110 and the second bank 120 may stop charging or discharging.

As is well known to those of ordinary skill in the art, although embodiments of the present invention have been described as having two banks, there may be more than two banks in any embodiment. If the number of banks increase, the number of the controllers and level shifters increase accordingly. If the number of banks is n, the number of controllers may be n and the number of level shifters may be n−1.

Figure 5:
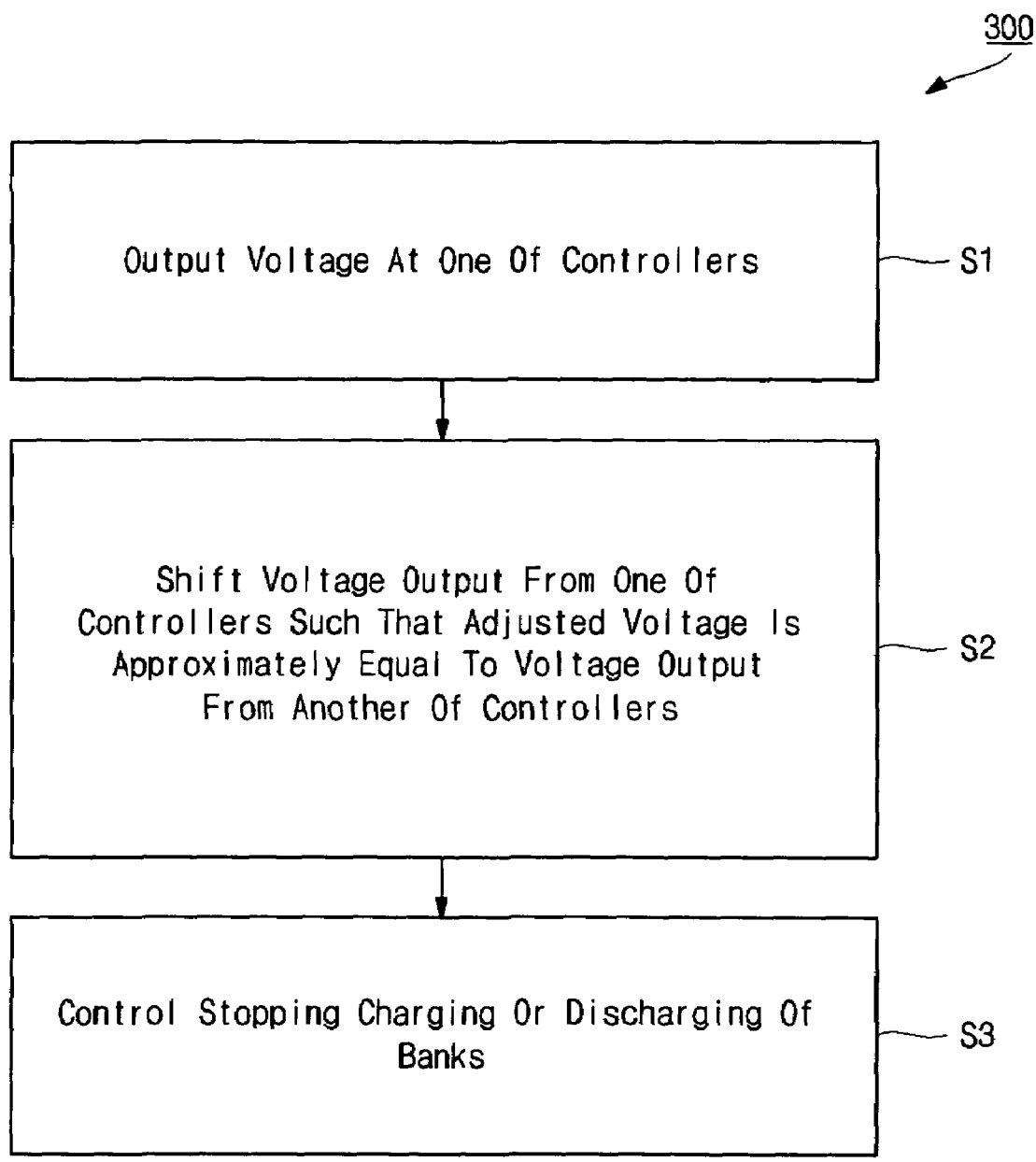
FIG. 5 is a flowchart showing a method of operation of a protective circuit for a secondary battery pack according to another exemplary embodiment of the present invention.

Referring to FIG. 5, an exemplary embodiment of a method 300 of operating a protective circuit for a secondary battery pack is generally as follows. In response to sensing overcharging or over-discharging from one of the banks, a controller may output (S1) a voltage. In response to at least one the level shifter receiving a voltage output from one of the controllers, the level shifter may shift (S2) the voltage output from the controller to create an adjusted voltage output, the adjusted voltage output being approximately equal to the voltage output from another one of the controllers. In response to the voltage output from one of the controllers or the adjusted voltage output from the at least one level shifter, a switching means may control (S3) stopping the charging or discharging of a plurality of banks. The switching means 190 may include the OR gate 160, the first switch 170 and the second switch 180. Alternately, the switching means 190 may be any other structure (whether implemented in hardware, software or otherwise) or combination thereof adapted to control stopping the charging or discharging of a plurality of banks.

A detailed description of an exemplary embodiment of the method 400 implementing an OR gate 160, a first switch 170 and a second switch 180 as the switching means 190 using the FIG. 1 protective circuit is as follows. The first controller 130 may sense the charging or discharging voltage or current of the first bank 110 using a sensor register (not shown). If the charging voltage or current is larger than a reference value (ie. overcharging) or the discharging voltage or current is smaller than a reference value (ie. over-discharging), the first controller 130 may output a predetermined voltage $V_{1C}$ to the OR gate 160. By way of example but not limitation, an output voltage $V_{1C}$ of the first controller 130 of 32V may be output to the OR gate 160.

In response to the first controller 130 output voltage $V_{1C}$, the OR gate 160 may output a predetermined voltage $V_{OR}$ to the first switch 170. As mentioned above, the OR gate 160 may be designed to recognize an output voltage of about 32V as a "high" state.

In response to the OR gate voltage output $V_{OR}$, the first switch 170 may toggle on. When the first switch 170 is a field effect transistor FET1, a predetermined current may flow from the drain to the source as a predetermined voltage is applied to the gate.

As the first switch 170 is toggled on in this manner, the second switch 180 installed on the large-current line CL may be toggled off, and the first bank 110 and second bank 120 stop functioning. For example, when the second switch 180 is a field effect transistor FET2, the current flowing from the drain to the source or vice versa is interrupted as the gate enters into a "low" state.

Alternately, if the second switch 180 is a fuse 181 and a heating resistor 182 combination, the second switch prevents the first bank 110 and the second bank 120 from charging or discharging based on the operation of the first switch 170. For example, in this configuration, as the first switch 170 is toggled on, currents may flow through the heating resistor 182 and the fuse 181 may be cut off by the high temperature caused by the heating resistor 182.

The second controller 140 may sense the charging or discharging voltage of the second bank 120 using a sensor register (not shown). If the charging voltage or current is larger than a reference value or the discharging voltage or current is smaller than a reference value, in response to the voltage sensed, the second controller 140 may output a predetermined voltage $V_{2C}$ to the level shifter 150. By way of example but not limitation, the second controller 140 may output a voltage of about 16V to the level shifter 150.

In this example, then, the level shifter 150 may shift the output voltage from 16V to about 32V and output the shifted voltage $V_{2C}$ to the OR gate 160. For example, when 32V is applied to the collector side of the photo transistor 153 and 16V is applied to the emitter side via the load resistor 154, a voltage of about 32V is applied between the emitter of the photo transistor 153 and the load resistor 154 during operation of the photo transistor 153 and is input to the OR gate 160.

As a result, an output voltage of 32V may be applied as an input to the OR gate 160, as in the case of the first controller 130. The OR gate 160 may then recognize it as a "high" signal and output a predetermined voltage $V_{OR}$. As explained above, the protective circuit may be designed such that the OR gate recognizes the voltage output from the second controller $V_{2C}$ as the "high" signal.

The first switch 170 may be toggled on by the output voltage from the OR gate 160. When the first switch 170 is a field effect transistor FET1, predetermined currents may flow from the drain to the source side as a predetermined voltage is applied to the gate.

As the first switch 170 is toggled on, the second switch 180 coupled with the large-current line may be toggled off. Accordingly, the first bank 110 and second bank 120 stop functioning. For example, in this configuration, when the second switch 180 is a field effect transistor, the current flowing from the drain to the source or vice versa may be interrupted as the gate enters into a "low" state.

Alternately, if the second switch 180 is a fuse 181 and a heating resistor 182 combination, the second switch prevents the first bank 110 and the second bank 120 from charging or discharging based on the operation of the first switch 170. For example in this configuration, as the first switch 170 is toggled on, currents flow through the heating resistor 182 and the fuse 181 is cut off by the high temperature caused by the heating resistor 182.

As mentioned above, the protective circuit for a secondary battery according to the present invention is advantageous in that, even when the controllers for sensing and processing the charging or discharging voltage from the banks output different voltages, a voltage output from one of the controllers is shifted to the same level as that of another voltage output from the other of the controllers. Therefore, the banks are fully protected from overcharging or over-discharging while preventing the increase of the number of the circuit components as much as possible.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A protective circuit for a secondary battery pack comprising
    a first bank to be charged or discharged and having cells coupled in series and in parallel, and
    a second bank to be charged or discharged and coupled in series to the first bank and having a plurality of cells coupled in series and in parallel, the protective circuit comprising:
    a first controller for sensing a charging or discharging voltage of the first bank and outputting a first controller output voltage if overcharging or over-discharging is sensed;
    a second controller for sensing a charging or discharging voltage of the second bank and outputting a second controller output voltage if overcharging or over-discharging is sensed;
    a level shifter for
        adjusting the second controller output voltage to an adjusted voltage output having about a same voltage level as the first controller output voltage;
    a first switch adapted to be toggled on/off in response to the first controller output voltage or the adjusted voltage output from the level shifter; and
    a second switch coupled with a large-current line for charging or discharging each of the first bank and the second bank, and adapted to be toggled on/off to stop the charging or discharging of the first bank and the second bank in accordance with whether the first switch is toggled on/off.

2. The protective circuit for a secondary battery pack as claimed in claim 1, wherein the first bank and the second bank each have four cells coupled in series, wherein each of the four cells coupled in series is coupled in parallel to another cell not one of the four cells coupled in series.

3. The protective circuit for a secondary battery pack as claimed in claim 1, wherein a total charging or discharging voltage of the first bank and the second bank when the first bank and the second bank are coupled in series is about two times a charging or discharging voltage of the first bank.

4. The protective circuit for a secondary battery pack as claimed in claim 1, wherein a charging or discharging voltage of the second bank is added to a charging or discharging voltage of the first bank and a total charging or discharging voltage of the first bank and the second bank is output to the first controller.

5. The protective circuit for a secondary battery pack as claimed in claim 1, wherein the first controller output voltage is approximately two times the second controller output voltage.

6. The protective circuit for a secondary battery pack as claimed in claim 1, wherein the level shifter comprises a photo coupler.

7. The protective circuit for a secondary battery pack as claimed in claim 1, wherein the level shifter comprises:
    a light-emitting diode for emitting a wavelength of light based on the second controller output voltage;
    a photo transistor adapted to be turned on in response to the light emitted from the light-emitting diode; and
    a load resistor coupled to an emitter portion of the photo transistor.

8. The protective circuit for a secondary battery pack as claimed in claim 7, wherein a voltage that is about the same as the first controller output voltage is applied to a collector portion of the photo transistor, a voltage that is about the same as the second controller output voltage is applied to a first end of the load resistor, and an output end of the level shifter is coupled to the emitter portion of the photo transistor and a second end of the load resistor, and the adjusted voltage output is output to the output end.

9. The protective circuit for a secondary battery pack as claimed in claim 1, wherein the first switch has an input end coupled to an OR gate for receiving the adjusted voltage output from the level shifter or an output voltage output from at least one of the controllers, and when the OR gate receives the adjusted voltage output from the level shifter or the output voltage output from at least one of the controllers, the OR gate outputs a voltage to the first switch to toggle on the first switch.

10. The protective circuit for a secondary battery pack as claimed in claim 1, wherein the first switch comprises a field effect transistor.

11. The protective circuit for a secondary battery pack as claimed in claim 1, wherein the second switch comprises a field effect transistor toggled on/off in accordance with a toggle state of the first switch.

12. The protective circuit for a secondary battery pack as claimed in claim 1, wherein the second switch comprises a fuse adapted to cut off in accordance with the toggle state of the first switch.

13. The protective circuit for a secondary battery pack as claimed in claim 1, wherein the second switch comprises a heating resistor operated by the first switch and a fuse cut off in response to the operation of the heating resistor.

14. A secondary battery pack comprising:
   a first bank to be charged or discharged and having cells coupled in series and in parallel; and
   a second bank to be charged or discharged and coupled in series to the first bank and having a plurality of cells coupled in series and in parallel; and
   a protective circuit comprising:
      a first controller for sensing a charging or discharging voltage of the first bank and outputting a first controller output voltage if overcharging or over-discharging is sensed;
      a second controller for sensing a charging or discharging voltage of the second bank and outputting a second controller output voltage if overcharging or over-discharging is sensed;
      a level shifter for adjusting the second controller output voltage to an adjusted voltage output having about a same voltage level as the first controller output voltage;
      a first switch adapted to be toggled on/off in response to the first controller output voltage or the adjusted voltage output from the level shifter; and
      a second switch coupled with a large-current line for charging or discharging each of the first bank and the second bank, and adapted to be toggled on/off to stop the charging or discharging of the first bank and the second bank in accordance with whether the first switch is toggled on/off.

15. The secondary battery pack as claimed in claim 14, wherein the first bank and the second bank each have four cells coupled in series, wherein each of the four cells coupled in series is coupled in parallel to another cell not one of the four cells coupled in series.

16. The secondary battery pack as claimed in claim 14, wherein a total charging or discharging voltage of the first bank and the second bank when the first bank and the second bank are coupled in series is about two times a charging or discharging voltage of the first bank.

17. The secondary battery pack as claimed in claim 14, wherein a charging or discharging voltage of the second bank is added to a charging or discharging voltage of the first bank and a total charging or discharging voltage of the first bank and the second bank is output to the first controller.

* * * * *

UNITED STATES PATENT AND TRADEMARK OFFICE
CERTIFICATE OF CORRECTION

PATENT NO.       : 7,583,060 B2                                                  Page 1 of 1
APPLICATION NO.  : 11/219520
DATED            : September 1, 2009
INVENTOR(S)      : Jong Sam Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 619 days.

Signed and Sealed this

Fourteenth Day of September, 2010

David J. Kappos
*Director of the United States Patent and Trademark Office*